United States Patent
Chiu et al.

(10) Patent No.: US 9,563,015 B1
(45) Date of Patent: Feb. 7, 2017

(54) OPTICAL WAVEGUIDE STRUCTURE AND MANUFACTURING METHOD THEREOF

(71) Applicant: National Sun Yat-sen University, Kaohsiung (TW)

(72) Inventors: Yi-Jen Chiu, Kaohsiung (TW); Yi-Jhe Chen, Kaohsiung (TW); Chung-Yi Lin, Kaohsiung (TW); Wei Lin, Kaohsiung (TW)

(73) Assignee: National Sun Yat-sen University (TW)

( * ) Notice: Subject to any disclaimer, the term of this patent is extended or adjusted under 35 U.S.C. 154(b) by 0 days.

(21) Appl. No.: 14/961,031

(22) Filed: Dec. 7, 2015

(30) Foreign Application Priority Data

Jul. 23, 2015 (TW) .............................. 104123936 A

(51) Int. Cl.
| | |
|---|---|
| G02B 6/26 | (2006.01) |
| G02B 6/122 | (2006.01) |
| G02B 6/136 | (2006.01) |
| G02B 6/132 | (2006.01) |
| G02B 6/42 | (2006.01) |
| G02B 6/12 | (2006.01) |

(52) U.S. Cl.
CPC ............ G02B 6/1228 (2013.01); G02B 6/132 (2013.01); G02B 6/136 (2013.01); *G02B 2006/12061* (2013.01); *G02B 2006/12147* (2013.01)

(58) Field of Classification Search
CPC ................. G02B 6/1228; G02B 6/305; G02B 2006/12061
See application file for complete search history.

(56) References Cited

U.S. PATENT DOCUMENTS

| | | | |
|---|---|---|---|
| 6,681,069 B2 | 1/2004 | Galarza et al. | |
| 6,767,756 B2* | 7/2004 | Lee | G02B 6/136 385/129 |
| 7,079,727 B1* | 7/2006 | Little | G02B 6/132 385/130 |
| 7,425,275 B2* | 9/2008 | Choi | G02B 6/136 216/12 |
| 8,170,383 B2 | 5/2012 | Tokushima | |
| 8,655,126 B2 | 2/2014 | Kondou et al. | |
| 9,268,089 B2* | 2/2016 | Heideman | G02B 6/1228 |
| 2003/0174956 A1* | 9/2003 | Viens | G02B 6/1228 385/43 |
| 2004/0202440 A1* | 10/2004 | Gothoskar | G02B 6/1228 385/129 |
| 2012/0156369 A1* | 6/2012 | Kim | G02B 6/12002 427/163.2 |

(Continued)

FOREIGN PATENT DOCUMENTS

| | | |
|---|---|---|
| CN | 103197386 B | 5/2015 |
| WO | 2008066160 A1 | 6/2008 |
| WO | 2010110496 A2 | 9/2010 |

*Primary Examiner* — Rhonda Peace
(74) *Attorney, Agent, or Firm* — Roger D. Emerson; Emerson, Thomson & Bennett, LLC

(57) ABSTRACT

An optical waveguide structure and a manufacturing method thereof are disclosed. The optical waveguide structure has a first waveguide layer, a binding layer, and a second waveguide layer. The first waveguide layer has a taper portion, a connecting portion, and a strip portion. The manufacturing method of the optical waveguide structure has steps of etching to form the first waveguide layer, and then etching to form the second waveguide layer under the first waveguide layer.

15 Claims, 8 Drawing Sheets

(56) References Cited

U.S. PATENT DOCUMENTS

2014/0286616 A1* 9/2014 Heideman ............ G02B 6/1228
385/131
2015/0086153 A1* 3/2015 Ono ........................ G02B 6/34
385/11

* cited by examiner

OPTICAL WAVEGUIDE STRUCTURE AND MANUFACTURING METHOD THEREOF

CROSS REFERENCE TO RELATED APPLICATIONS

This application claims the benefit of priority of Taiwan Patent Application No. 104123936, filed on Jul. 23, 2015, the disclosure of which is incorporated herein by reference.

FIELD OF THE INVENTION

The present invention relates to an optical waveguide structure and a manufacturing method thereof, and in particular relates to an optical waveguide structure with a heterojunction interface and a manufacturing method of the optical waveguide.

BACKGROUND OF THE INVENTION

Optical waveguide means a medium for introducing a light wave. In order to make light transmit in a desired direction, the optical waveguide may have different shapes and structures. Currently, the main disadvantage of the heterogeneous integrated optical waveguide structure is that the light cannot be completely coupled from the passive waveguide to the active waveguide, therefore resulting in a mixed modal effect. The main disadvantage of the mixed mode is that the input light is unable to be efficiently used, therefore, it is difficult to be applied to a three-dimensional integrated circuit (3D integrated circuit) to be vertically integrated with other optical or electronic components.

In the manufacturing process, the heterogeneous integrated optical waveguide comprises a passive waveguide formed of silicon having a different shape of the structure on the silicon substrate, and then a heterogeneity integration of a III-V compound and the passive waveguide is performed after an alignment process. Because the passive waveguide structure is a submicron level structure, the difficulty in the alignment process is very high, and thus it cannot be 100% aligned with the current technology, so that the efficiency and quality of the heterogeneous integrated optical waveguide cannot be effectively improved.

It is therefore necessary to provide an optical waveguide structure and a manufacturing method thereof to completely couple the light from a passive waveguide to an active waveguide, to reduce the difficulty of the production process, and improve the accuracy in the alignment process, in order to solve the problems existing in the conventional technology as described above.

SUMMARY OF THE INVENTION

A primary object of the present invention is to provide an optical waveguide structure which is able to completely couple a light from a passive waveguide to an active waveguide, so as to improve the use efficiency of the light and benefit the integration of 3D IC.

A secondary object of the present invention is to provide a manufacturing method of an optical waveguide structure. After adhering an active waveguide material and a passive waveguide material, a selective etching process is performed so that an active waveguide and a passive waveguide are formed in order without a submicron-scaled alignment process so that the accuracy of the alignment between the active waveguide and the passive waveguide is improved, the difficulty of the process is reduced, and the production yield is increased.

To achieve the above object, the present invention provides an optical waveguide structure, comprising: a first waveguide layer having a taper portion, a connecting portion, and a strip portion, wherein the connecting portion is disposed between the taper portion and the strip portion; a second waveguide layer; and a binding layer disposed between the first waveguide layer and the second waveguide layer; wherein the first waveguide layer is used for coupling a light beam through the taper portion and the connecting portion to the strip portion; and the taper portion has a length ranged from 20 to 30 microns and a width gradually broadened from 0.3 microns to 0.5 microns.

In one embodiment of the present invention, the first waveguide layer is formed of a III-V compound.

In one embodiment of the present invention, the III-V compound is InGaAsP or InGaAsAl.

In one embodiment of the present invention, the second waveguide layer is formed of silicon.

In one embodiment of the present invention, the binding layer is formed of divinylsiloxane-bis-benzocyclobutene (DVS-BCB), spin on glass (SOG), or a thermal curing polymer.

In one embodiment of the present invention, the second waveguide layer has a distance ranged from 0 to 15 µm, exceeding the taper portion of the first waveguide layer in a longitudinal direction from a top view.

Furthermore, the present invention provides a manufacturing method of an optical waveguide structure, comprising steps of: (1) providing a silicon substrate; (2) forming a binding material layer on the silicon substrate; (3) disposing a III-V compound layer on the binding material layer, and performing a heterojunction treatment on the silicon substrate, the binding material layer, and the III-V compound layer; (4) forming a non-metallic barrier layer, a metallic barrier layer, and a first photoresist pattern on the III-V compound layer in order; (5) performing a first selective etching on the metallic barrier layer by using the first photoresist pattern, so as to form a first etching pattern on the non-metallic barrier layer; (6) simultaneously etching the non-metallic barrier layer and the III-V compound layer by using the first etching pattern as a first mask, so as to form a first waveguide layer on the silicon substrate; (7) removing the first etching pattern; (8) depositing a silicon nitride layer on the first waveguide layer and the binding material layer so that the first waveguide layer is covered with the silicon nitride layer; (9) forming a second photoresist pattern on the silicon nitride layer, wherein the second photoresist pattern completely covers the first waveguide layer; (10) etching to remove a part of the silicon nitride layer by using the second photoresist pattern so as to form a second etching pattern on the binding material layer; and (11) performing a second selective etching on the binding material layer and the silicon substrate by using the second etching pattern as a second mask so as to form a binding layer and a second waveguide layer.

In one embodiment of the present invention, the heterojunction treatment comprises steps of: heating the silicon substrate, the binding material layer and the III-V compound layer in an oven by a temperature rising rate of 1.6° C./min, and then pressing by a downward pressure of 40 N/cm$^2$; and removing the downward pressure when heating to reach a temperature at 280° C., and then introducing nitrogen gas into the oven for 90 minutes.

In one embodiment of the present invention, the silicon substrate further comprises an insulating layer, and the silicon substrate is disposed between the insulating layer and the III-V compound layer.

In one embodiment of the present invention, the non-metallic barrier layer is formed of silicon dioxide.

In one embodiment of the present invention, the metallic barrier layer is formed of metal chromium.

In one embodiment of the present invention, the first selective etching is performed by a wet etching process for removing the metallic barrier layer, so as to leave the non-metallic barrier layer.

In one embodiment of the present invention, the step (6) is a dry etching process.

In one embodiment of the present invention, the silicon nitride layer is deposited by plasma-enhanced chemical vapor deposition.

In one embodiment of the present invention, the second selective etching is performed by using potassium hydroxide in a wet etching process, so as to remove the binding material layer and the silicon substrate beyond a coverage area of the silicon nitride.

DESCRIPTION OF THE DRAWINGS

FIG. 1B: a cross-sectional view taken along a line a-a in FIG. 1A).

DETAILED DESCRIPTION OF THE PREFERRED EMBODIMENTS

The structure and the technical means adopted by the present invention to achieve the above and other objects can be best understood by referring to the following detailed description of the preferred embodiments. In addition, directional terms described by the present invention, such as upper, lower, front, back, left, right, inner, outer, side, etc., are only directions by referring to the accompanying drawings, and thus the directional terms are used to describe and understand the present invention, but the present invention is not limited thereto. Furthermore, if there is no specific description in the invention, singular terms such as "a", "one", and "the" include the plural number. For example, "a compound" or "at least one compound" may include a plurality of compounds, and the mixtures thereof. If there is no specific description in the invention, "%" means "weight percentage (wt %)", and the numerical range (e.g. 10%~11% of A) contains the upper and lower limit (i.e. 10%≤A≤11%). If the lower limit is not defined in the range (e.g. less than, or below 0.2% of B), it means that the lower limit is 0 (i.e. 0%≤B≤0.2%). The proportion of "weight percent" of each component can be replaced by the proportion of "weight portion" thereof. The abovementioned terms are used to describe and understand the present invention, but the present invention is not limited thereto.

Figure 1A:
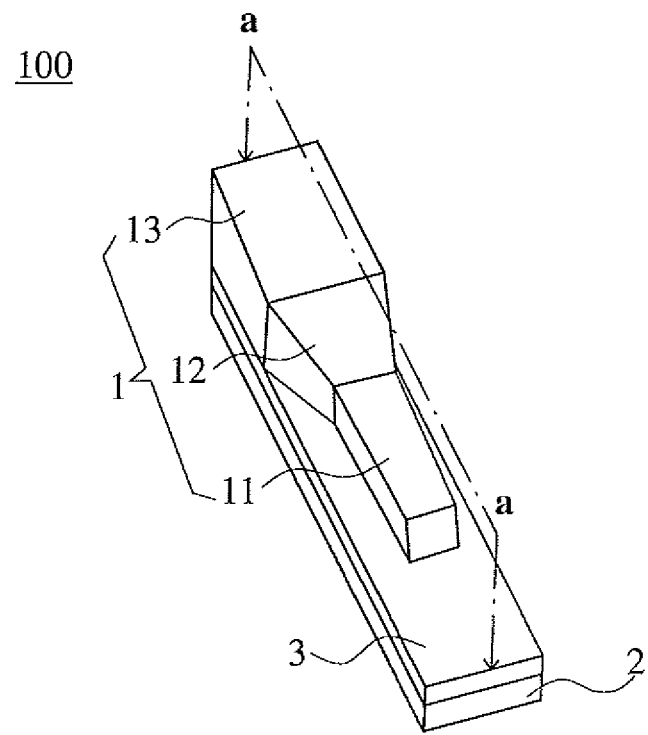
FIGS. 1A and 1B are schematic views of an optical waveguide structure according to one embodiment of the present invention (FIG. 1A: three-dimensional view.

Refer to FIGS. 1A to 10, which show an optical waveguide structure 100 according to one embodiment of the present invention. As shown in FIG. 1A and FIG. 1B, the optical waveguide structure 100 mainly comprises a first waveguide layer 1, a binding layer 3, and a second waveguide layer 2 from top down.

Refer back to FIG. 1A, the first waveguide layer 1 comprises a taper portion 11, a connecting portion 12, and a strip portion 13, wherein the connecting portion 12 is disposed between the taper portion 11 and the strip portion 13. The first waveguide layer 1 can be formed of a III-V compound, such as InGaAsP or InGaAsAl, but it is not limited thereto. The III-V compound, which is capable of being an active waveguide, can be used. A light beam can pass through the taper portion 11 and enter the first waveguide layer 1, then pass through the connecting portion 12 so as to be coupled to the strip portion 13 and leave the optical waveguide structure 100. The taper portion 11 has a gradually narrowed structure, and a length ranged from 20 to 30 microns in a side view, for example, 20, 21, 23, 25, 27, 28, or 29 microns. From a front end to a back end of the taper portion 11, the taper portion 11 has a width gradually broadened from 0.3 to 0.5 microns. Furthermore, the connecting portion 12 also has a gradually narrowed structure which has a different inclined angle from that of the taper portion 11. The inclined angle of the connecting portion 12 is relatively greater, so that an obvious boundary is present between the connecting portion 12 and the taper portion 11. In addition, in a side view, the connecting portion 12 has a length ranged from 15 to 25 microns, for example, 15, 16, 17, 20, 22, 23, or 25 microns, and a width from a front end to a back end can be broadened from 0.5 to 2 microns. The strip portion 13 is a strip structure shaped approximately as a rectangle. In a side view, the strip portion 13 has a length ranged from 60 to 120 microns, for example, 60, 65, 70, 75, 80, 85, 90, 95, 100, 105, 110, 115, or 120 microns; and a width from a front end to a back end can be maintained at 2 microns. The present invention can efficiently improve the coupling rate from the passive waveguide to the active waveguide by using this optical waveguide structure.

Figure 1B:
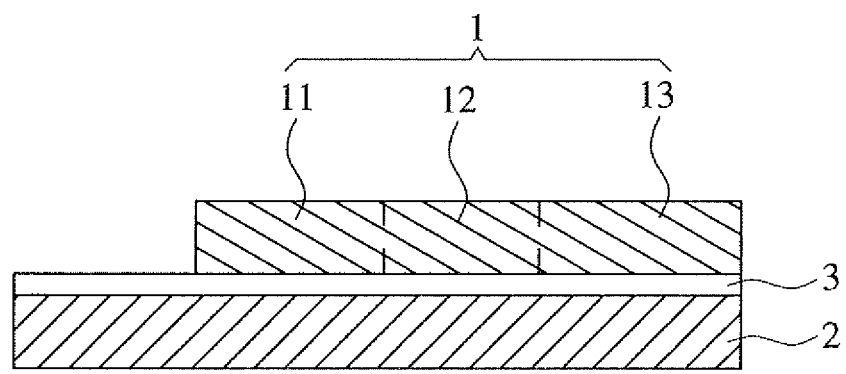

Refer to FIG. 1B, which is a cross-sectional view taken along a line a-a in FIG. 1A. As shown in FIG. 1B, the binding layer 3 is disposed between the first waveguide layer 1 and the second waveguide layer 2. The binding layer 3 can be formed of divinylsiloxane-bis-benzocyclobutene (DVS-BCB), spin on glass (SOG), or a thermal curing polymer. The second waveguide layer 2 can be formed of silicon, but it is not limited thereto, a silicon-based material which can be used to form a passive waveguide is preferable, such as SOI (Silicon On Insulator). In a top view, the front end (left end in the figure) of the second waveguide layer 2 exceeds the taper portion 11 of the first waveguide layer 1 and has a distance ranged from 0 to 15 microns in a longitudinal direction, such as 0, 1, 2, 4, 5, 6, 8, 10, 12, 14, or 15 microns.

Figure 2A:
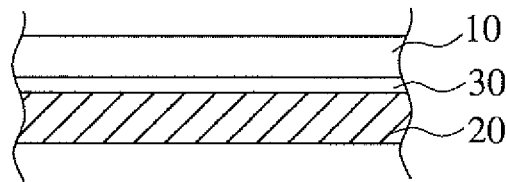
FIGS. 2A to 2F are schematic views showing a manufacturing method of a first waveguide layer in the optical waveguide structure according to one embodiment of the present invention.

Furthermore, referring to FIG. 2A, a manufacturing method of an optical waveguide structure according to one embodiment of the present invention is firstly to execute the step of (1) providing a silicon substrate 20. In this step, the silicon substrate 20 comprises an insulating layer or a carrier layer (not shown) so that the silicon substrate 20 is configured between the insulating layer or the carrier and the III-V compound layer.

Next, referring to FIG. 2A again, a manufacturing method of an optical waveguide structure according to one embodiment of the present invention is to execute the step of (2) forming a binding material layer 30 on the silicon substrate 20. In this step, the binding material layer 30 can be formed of divinylsiloxane-bis-benzocyclobutene (DVS-BCB), spin on glass (SOG), or a thermal curing polymer by coating on the silicon substrate.

Next, referring to FIG. 2A again, a manufacturing method of an optical waveguide structure according to one embodiment of the present invention is to execute the step of: (3) disposing a III-V compound layer 10 on the binding material layer 30, and performing a heterojunction treatment on the silicon substrate 20, the binding material layer 30, and the III-V compound layer 10. In this step, the heterojunction treatment comprises at least steps of: (3-1) heating the silicon substrate 20, the binding material layer 30, and the III-V compound layer 10 in an oven by a temperature rising rate of 1.6° C./min, and then pressing by a downward pressure of 40 N/cm$^2$; and (3-2) removing the downward pressure when heating to reach a temperature at 280° C., and then introducing nitrogen gas into the oven for 90 minutes. Preferably, the III-V compound layer can be formed of InGaAsP or InGaAsAl.

Figure 2B:
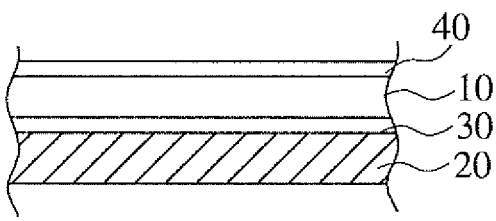
Figure 2C:
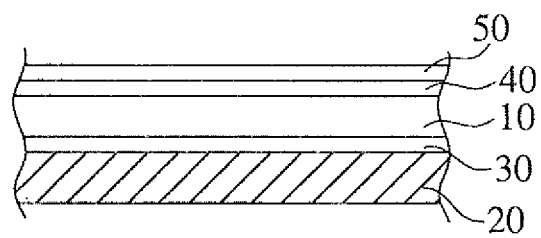
Figure 2D:
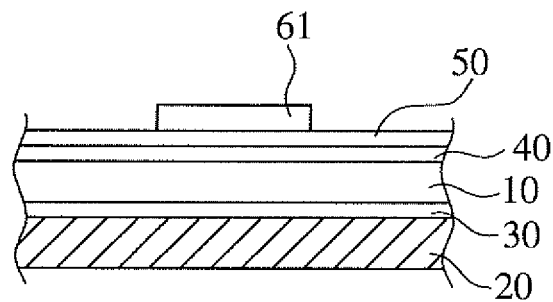

Next, referring to FIGS. 2B, 2C, and 2D, a manufacturing method of an optical waveguide structure according to one embodiment of the present invention is to execute the step of: (4) forming a non-metallic barrier layer 40, a metallic barrier layer 50, and a first photoresist pattern 61 on the III-V compound layer 10 in order. In this step, the non-metallic barrier layer 40 can be formed of silicon dioxide ($SiO_2$). The metallic barrier layer 50 can be formed of metal chromium (Cr).

Figure 2E:
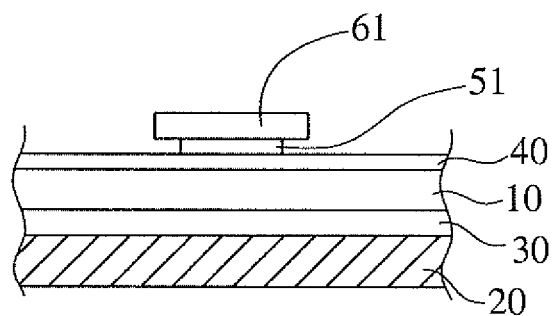

Next, referring to FIGS. 2D and 2E, a manufacturing method of an optical waveguide structure according to one embodiment of the present invention is to execute the step of: (5) performing a first selective etching on the metallic barrier layer 50 by using the first photoresist pattern 61, so as to form a first etching pattern 51 on the non-metallic barrier layer 40. The first selective etching is performed by a wet etching process for removing a part of the metallic barrier layer 50, so as to leave (i.e. not remove) the non-metallic barrier layer 40. Because the wet etching process is performed, the width of the first etching pattern 51 is slightly less than that of the first photoresist pattern 61. After the first etching pattern 51 is formed, the first photoresist pattern 61 is removed.

Figure 2F:
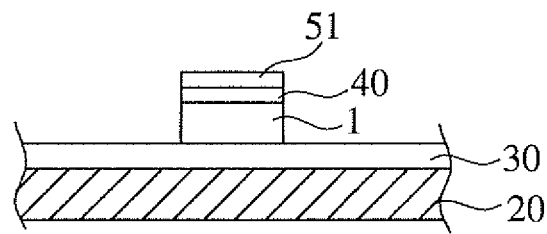

Next, referring to FIGS. 2E and 2F, a manufacturing method of an optical waveguide structure according to one embodiment of the present invention is to execute the step of: (6) simultaneously etching the non-metallic barrier layer 40 and the III-V compound layer 10 by using the first etching pattern 51 as a first mask, so as to form a first waveguide layer 1 on the silicon substrate 20. Simultaneously, the non-metallic barrier layer 40 has the same pattern with the first waveguide layer 1. The step (6) is for example a dry etching process performed by using plasma for etching the non-metallic barrier layer 40 and the III-V compound layer 10 so as to form the first waveguide layer 1.

Figure 3A:
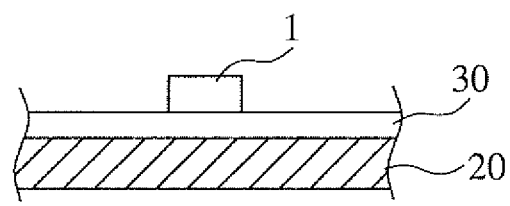
FIGS. 3A to 3D are schematic views showing a manufacturing method of a second waveguide layer in the optical waveguide structure according to one embodiment of the present invention.

Next, referring to FIGS. 2F and 3A, a manufacturing method of an optical waveguide structure according to one embodiment of the present invention is to execute the step of: (7) removing the first etching pattern 51. In this step, the first etching pattern 51 can be removed by a suitable etching process, such as a dry etching process by using $Cl_2$ gas for removing the first etching pattern 51. Preferably, the step further comprises a step of removing the non-metallic barrier layer 40 to obtain a clean surface of the first waveguide layer 1. Because the non-metallic barrier layer 40 has no influence on the function and effect of the first waveguide layer 1 in practice, the non-metallic barrier layer 40 can be optionally removed in this step.

Figure 3B:
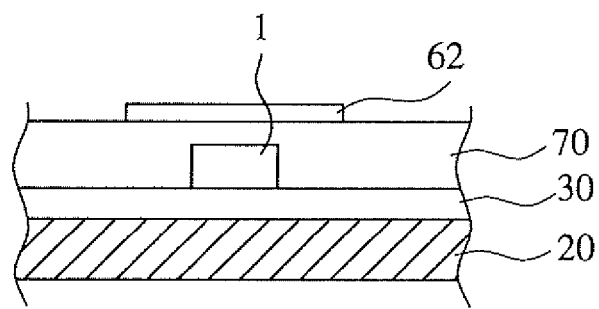

Next, referring to FIG. 3B, a manufacturing method of an optical waveguide structure according to one embodiment of the present invention is to execute the step of: (8) depositing a silicon nitride layer 70 on the first waveguide layer 1 and the silicon substrate 20 so that the first waveguide layer 1 is covered with the silicon nitride layer 70. The silicon nitride layer 70 in step (8) is deposited by plasma-enhanced chemical vapor deposition (PECVD).

Next, referring to FIG. 3B again, a manufacturing method of an optical waveguide structure according to one embodiment of the present invention is to execute the step of: (9) forming a second photoresist pattern 62 on the silicon nitride layer 70, wherein the second photoresist pattern 62 completely covers the first waveguide layer 1. In this step, the primary purpose is to use the advantage of the second photoresist pattern 62 and the first photoresist pattern 61 (as shown in FIG. 2D) that can be pre-aligned by mask design. Therefore, the silicon substrate 20 under the first waveguide layer 1 can be accurately etched to form the passive waveguide (i.e. a second waveguide layer 2). Then, the selective etching is used for etching silicon nitride and silicon to achieve a self-alignment of the passive waveguide and the active waveguide.

Figure 3C:
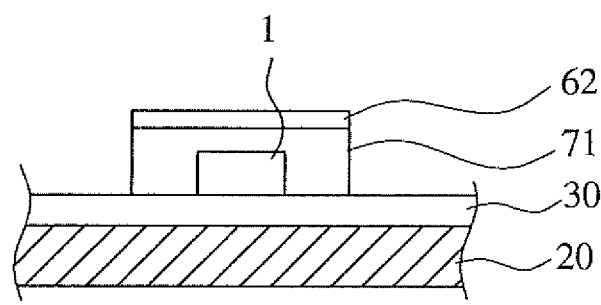

Next, as shown in FIGS. 3B and 3C, a manufacturing method of an optical waveguide structure according to one embodiment of the present invention is to execute the step of: (10) etching to remove a part of the silicon nitride layer 70 by using the second photoresist pattern 62 so that the remained silicon nitride layer forms a second etching pattern 71 on the binding material layer 30 and the silicon substrate 20. In this step, the silicon nitride layer 70 can be etched to form the same pattern of the second photoresist pattern 62 by using $CF_4$ in the dry etching process. Subsequently, the second photoresist pattern 62 is removed.

Figure 3D:
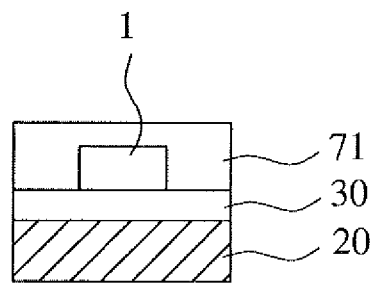

Next, referring to FIGS. 3C and 3D, a manufacturing method of an optical waveguide structure according to one embodiment of the present invention is to execute the step of: (11) performing a second selective etching on the binding material layer 30 and the silicon substrate 20 by using the second etching pattern 71 as a second mask so as to form a binding layer and a second waveguide layer 2. In this step, silicon can be leaved within a coverage area (scope) of the second etching pattern 71 formed by the silicon nitride layer 70 by the selective etching so as to form the second waveguide layer 2. That is, the second etching pattern 71 can be used as a protection layer for silicon. The etching agent in this step is not particularly limited as long as it can etch silicon but not etch silicon nitride. Preferably, the second selective etching is performed by using potassium hydroxide (KOH) in a wet etching process, so as to remove the binding material layer and the silicon substrate beyond the coverage area (scope) of the silicon nitride.

Subsequently, the manufacturing method further comprises a step of removing the second etching pattern 71 after the step (11), or further forming a protection layer on the first waveguide layer 1 and the second waveguide layer 2 after removing the second etching pattern 71, but it is not limited thereto.

To verify the effect and function of the optical waveguide structure according to the present invention, the test results are described as below.

Figure 4:
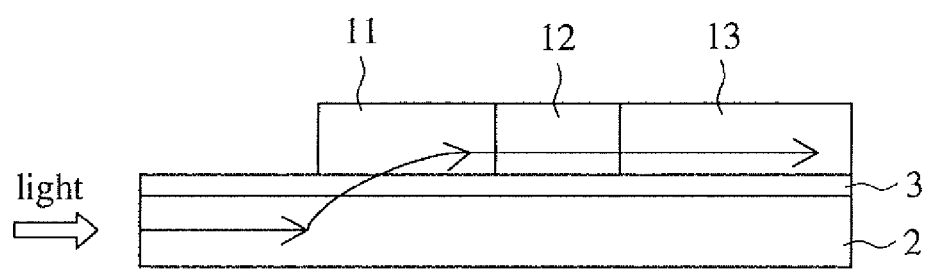
FIG. 4 is a schematic view showing the measurement of the optical waveguide structure according to one embodiment of the present invention.
Figure 5A:
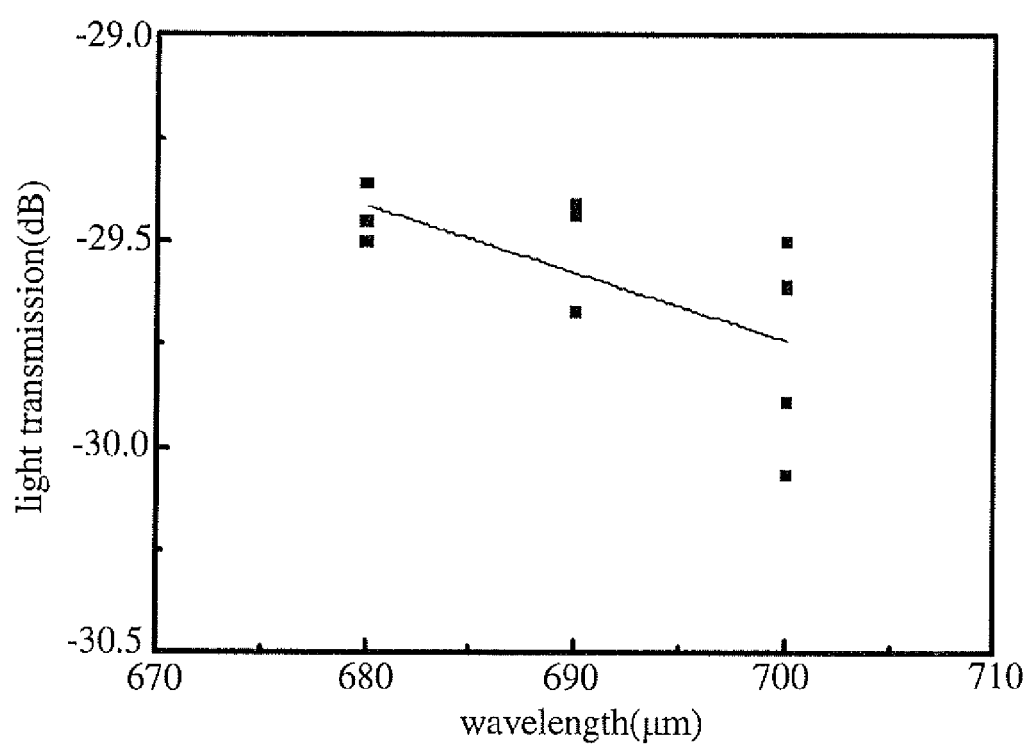
FIGS. 5A to 5B are diagrams showing the tendency of transmission loss of the active waveguide and the passive waveguide.
Figure 5B:
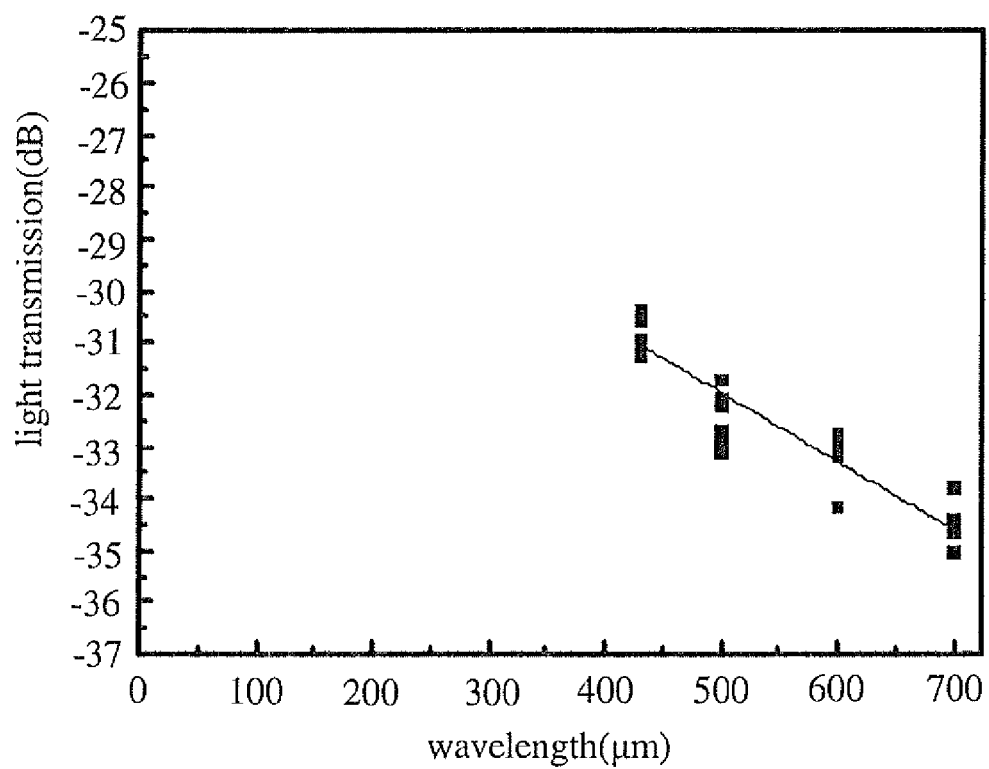

As shown in FIG. 4, a laser light source with wavelength of 1500 nm and energy of 0 dBm is used, and enters the optical waveguide structure 100 from the second waveguide layer 2. A taper optical fiber is disposed on another side of the first waveguide layer 1 (III-V waveguide) at the strip portion 13 to receive the light transmission, and the light energy calculated based on the laser power is −39.95 dBm. As shown in FIGS. 5A and 5B, which respectively shows coupling loss of the optical fiber and the optical waveguide structure. The measured light energy, the coupling loss of the optical fiber and the optical waveguide structure are gathered and calculated to obtain the coupling efficiency of the optical waveguide structure 100 at around 80%. It can be known from this result that most light energy of the passive waveguide can be coupled to the active waveguide, and the coupling length is only 35 microns (μm). That is, about 25 microns of the taper portion 11 plus 10 microns of the front end of the second waveguide layer 2 can achieve the coupling efficiency.

Compared with the current technology, the optical waveguide structure according to the present invention can couple most of light energy from the passive waveguide to the active waveguide, and therefore the light energy can be efficiently applied to other waveguide elements, such as light fibers. In addition, the manufacturing method of the optical waveguide structure is to integrate a III-V material (used as active waveguide) and a silicon substrate (as passive waveguide), and form the active waveguide and passive waveguide by selective etching without an alignment process. Therefore, the process difficulty is much reduced. Furthermore, the manufacturing method comprising the photoresist and etching process is very suitable for applying to a wafer-level process.

The present invention has been described with preferred embodiments thereof and it is understood that many changes and modifications to the described embodiments can be carried out without departing from the scope and the spirit of the invention that is intended to be limited only by the appended claims.

What is claimed is:

1. An optical waveguide structure, comprising:
    a first waveguide layer having a taper portion, a connecting portion, and a strip portion, wherein the connecting portion is disposed between the taper portion and the strip portion;
    a second waveguide layer; and
    a binding layer disposed between the first waveguide layer and the second waveguide layer;
    wherein the first waveguide layer is configured to couple a light beam through the taper portion and the connecting portion to the strip portion; and the taper portion has a length ranged from 20 to 30 microns and a width gradually broadened from 0.3 microns to 0.5 microns.

2. The optical waveguide structure according to claim 1, wherein the first waveguide layer is formed of a III-V compound.

3. The optical waveguide structure according to claim 2, wherein the III-V compound is InGaAsP or InGaAsAl.

4. The optical waveguide structure according to claim 1, wherein the second waveguide layer is formed of silicon.

5. The optical waveguide structure according to claim 1, wherein the binding layer is formed of divinylsiloxane-bis-benzocyclobutene (DVS-BCB), spin on glass (SOG), or a thermal curing polymer.

6. The optical waveguide structure according to claim 1, wherein the second waveguide layer has a distance ranged from 0 to 15 μm, exceeding the taper portion of the first waveguide layer in a longitudinal direction from a top view.

7. A manufacturing method of an optical waveguide structure, comprising steps of:
    (1) providing a silicon substrate;
    (2) forming a binding material layer on the silicon substrate;
    (3) disposing a III-V compound layer on the binding material layer, and performing a heterojunction treatment on the silicon substrate, the binding material layer and the III-V compound layer;
    (4) forming a non-metallic barrier layer, a metallic barrier layer and a first photoresist pattern on the III-V compound layer in order;
    (5) performing a first selective etching on the metallic barrier layer by using the first photoresist pattern, so as to form a first etching pattern on the non-metallic barrier layer;
    (6) simultaneously etching the non-metallic barrier layer and the III-V compound layer by using the first etching pattern as a first mask, so as to form a first waveguide layer on the silicon substrate;
    (7) removing the first etching pattern;
    (8) depositing a silicon nitride layer on the first waveguide layer and the binding material layer, so that the first waveguide layer is covered with the silicon nitride layer;
    (9) forming a second photoresist pattern on the silicon nitride layer, wherein the second photoresist pattern completely covers the first waveguide layer;
    (10) etching to remove a part of the silicon nitride layer by using the second photoresist pattern, so as to form a second etching pattern on the binding material layer; and
    (11) performing a second selective etching on the binding material layer and the silicon substrate by using the second etching pattern as a second mask, so as to form a binding layer and a second waveguide layer.

8. The manufacturing method according to claim 7, wherein the heterojunction treatment comprises steps of:
    heating the silicon substrate, the binding material layer and the III-V compound layer in an oven by a temperature rising rate of 1.6° C./min, and then pressing by a downward pressure of 40 N/cm$^2$; and
    removing the downward pressure when heating to reach a temperature at 280° C., and then introducing nitrogen gas into the oven for 90 minutes.

9. The manufacturing method according to claim 7, wherein the silicon substrate further comprises an insulating layer, and the silicon substrate is disposed between the insulating layer and the III-V compound layer.

10. The manufacturing method according to claim 7, wherein the non-metallic barrier layer is formed of silicon dioxide.

11. The manufacturing method according to claim 7, wherein the metallic barrier layer is formed of metal chromium.

12. The manufacturing method according to claim 7, wherein the first selective etching is performed by a wet etching process for removing the metallic barrier layer, so as to leave the non-metallic barrier layer.

13. The manufacturing method according to claim 7, wherein the step (6) is a dry etching process.

14. The manufacturing method according to claim 7, wherein the silicon nitride layer is deposited by plasma-enhanced chemical vapor deposition.

15. The manufacturing method according to claim 7, wherein the second selective etching is performed by using potassium hydroxide in a wet etching process, so as to remove the binding material layer and the silicon substrate beyond a coverage area of the silicon nitride.

\* \* \* \* \*